United States Patent
Taghizadeh et al.

(10) Patent No.: US 11,921,198 B2
(45) Date of Patent: Mar. 5, 2024

(54) APPARATUS FOR DETERMINING SPATIAL POSITIONS OF MULTIPLE AUDIO SOURCES

(71) Applicants: Huawei Technologies Co., Ltd., Shenzhen (CN); FRIEDRICH-ALEXANDER-UNIVERSITÄT ERLANGEN-NÜRNBERG, Erlangen (DE)

(72) Inventors: Mohammad Taghizadeh, Munich (DE); Michael Günther, Erlangen (DE); Andreas Brendel, Erlangen (DE); Walter Kellermann, Erlangen (DE)

(73) Assignees: Huawei Technologies Co., Ltd., Shenzhen (CN); FRIEDRICH-ALEXANDER-UNIVERSITÄT ERLANGEN-NÜRNBERG, Erlangen (DE)

( * ) Notice: Subject to any disclaimer, the term of this patent is extended or adjusted under 35 U.S.C. 154(b) by 134 days.

(21) Appl. No.: 17/582,837

(22) Filed: Jan. 24, 2022

(65) Prior Publication Data
US 2022/0163664 A1    May 26, 2022

Related U.S. Application Data

(63) Continuation of application No. PCT/EP2019/069926, filed on Jul. 24, 2019.

(51) Int. Cl.
*H04R 1/40* (2006.01)
*G01S 15/46* (2006.01)
*H04R 3/00* (2006.01)

(52) U.S. Cl.
CPC .............. *G01S 15/46* (2013.01); *H04R 1/406* (2013.01); *H04R 3/005* (2013.01); *G01S 2015/465* (2013.01)

(58) Field of Classification Search
CPC ............ H04S 7/303; H04R 1/406; H04R 1/20
(Continued)

(56) References Cited

U.S. PATENT DOCUMENTS 9,069,065 B1    6/2015  Coley et al.
9,462,379 B2 *  10/2016 Ivanov .................. H04M 1/605
(Continued)

FOREIGN PATENT DOCUMENTS

CN    108713323 A    10/2018
WO    2016100460 A1   6/2016

OTHER PUBLICATIONS

Granström et al., "A PHD filter for tracking multiple extended targets using random matrices," IEEE Transactions on Signal Processing, vol. 60, No. 11, Total 16 pages, Institute of Electrical and Electronics Engineers, New York, New York (Nov. 2012).

(Continued)

*Primary Examiner* — Disler Paul
(74) *Attorney, Agent, or Firm* — Leydig, Voit & Mayer, Ltd.

(57) ABSTRACT

An apparatus determines a spatial position of an audio source in multi moving audio sources scenarios. The apparatus receives audio signal versions as local sound waves. The apparatus determines first and second probabilities for a direction of arrival of the audio signal version based on the audio signal versions received within a first time interval; determines third and fourth probabilities for the direction of arrival of the audio signal version based on the audio signal versions received within a second time interval; determines a first probability difference between the first and third probabilities; determines a second probability difference between the second and fourth probabilities; combines the third probability and the first probability difference to obtain an updated third probability; combines the fourth probability (Continued)

with the second probability difference to obtain an updated fourth probability; and determines the spatial position based on the updated third and fourth probabilities.

17 Claims, 6 Drawing Sheets

(58) Field of Classification Search
USPC ..................................................... 381/91–92
See application file for complete search history.

(56) References Cited

U.S. PATENT DOCUMENTS

| | | | | |
|---|---|---|---|---|
| 10,893,373 | B2* | 1/2021 | McGrath | H04S 7/303 |
| 10,957,299 | B2* | 3/2021 | Tourbabin | G01S 3/802 |
| 11,100,384 | B2* | 8/2021 | Finkelstein | G06N 5/04 |
| 11,351,988 | B2* | 6/2022 | Soltanian | G05D 1/0289 |
| 2018/0213309 | A1 | 7/2018 | Laitinen et al. | |
| 2019/0219660 | A1 | 7/2019 | Cordourier Maruri et al. | |

OTHER PUBLICATIONS

Lin et al., "Track Labeling and PHD Filter for Multitarget Tracking," IEEE Transactions on Aerospace and Electronic Systems, vol. 42, No. 3, pp. 778-795, Institute of Electrical and Electronics Engineers, New York, New York (Jul. 2006).

Blackman "Multiple Hypothesis Tracking For Multiple Target Tracking," IEEE A&E Systems Magazine, vol. 19, No. 1, pp. 5-18, Institute of Electrical and Electronics Engineers, New York, New York (Jan. 2004).

Mahler "Multitarget Bayes Filtering via First-Order Multitarget Moments," IEEE Transactions on Aerospace and Electronic Systems, vol. 39, No. 4, pp. 1152-1178, Institute of Electrical and Electronics Engineers, New York, New York (Oct. 2003).

Bar-Shalom et al., "Multitarget-Multisensor Tracking: Applications and Advances," vol. 3, Artech House, USA, Total 3 pages (2000).

Streit et al., "Probabilistic Multi-Hypothesis Tracking," Naval Undersea Warfare Center Division, NUWC-NPT Technical Report 10,428, Total 52 pages, Newport, Rhode Island (Feb. 15, 1995).

Bar-Shalom et al., "Tracking in a Cluttered Environment With Probabilistic Data Association," Automatica, vol. 11, Total 11 pages, Pergamon Press, Printed in Great Britain (1975).

Schuhmacher et al., "A Consistent Metric for Performance Evaluation of Multi-Object Filters," IEEE Transactions on Signal Processing, vol. 56, No. 8, pp. 3447-3457, Institute of Electrical and Electronics Engineers, New York, New York (Aug. 2008).

Garofolo et al., "CSR-I (WSJ0) Complete," Linguistic Data Consortium, The Trustees of the University of Pennsylvania, Total 1 page, Philadelphia, PA (May 2007).

* cited by examiner

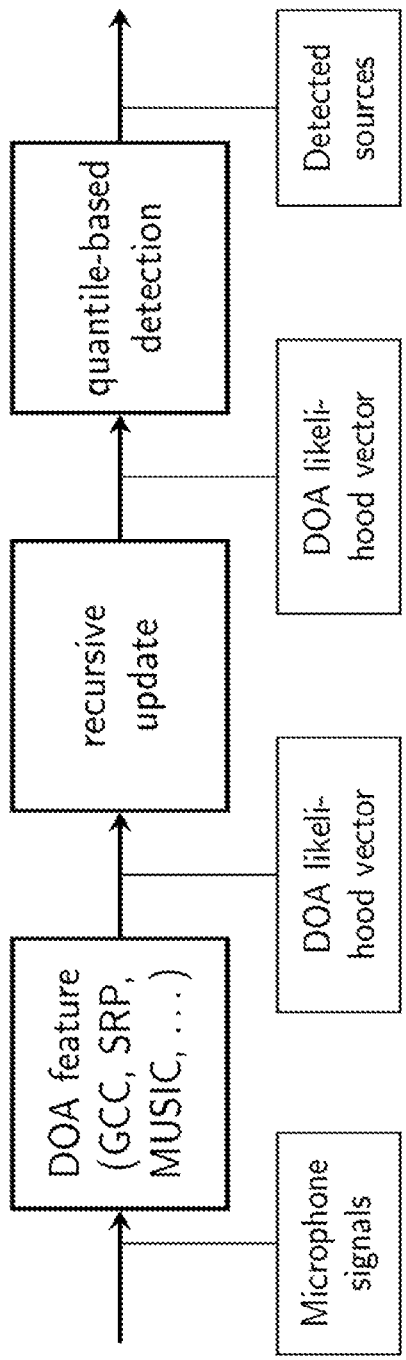
Fig. 2
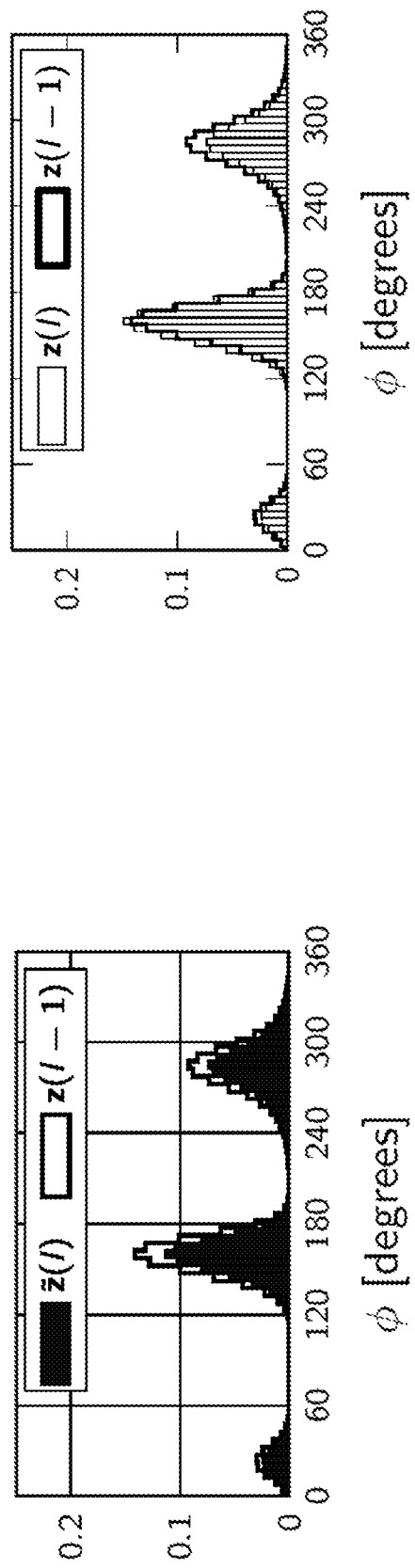
Fig. 3
Fig. 4

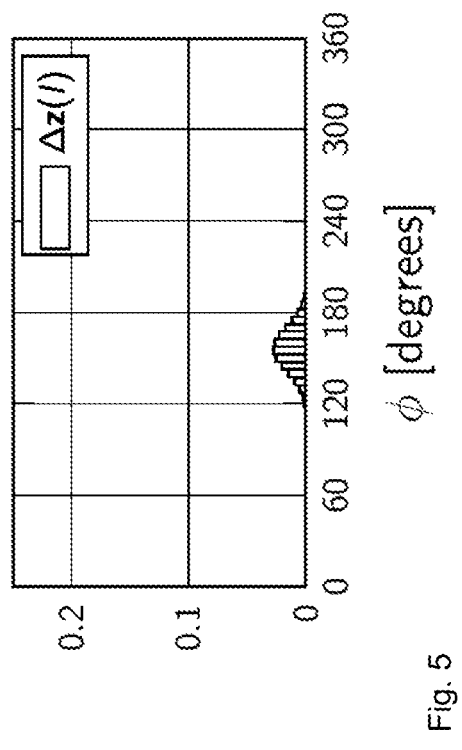
Fig. 5
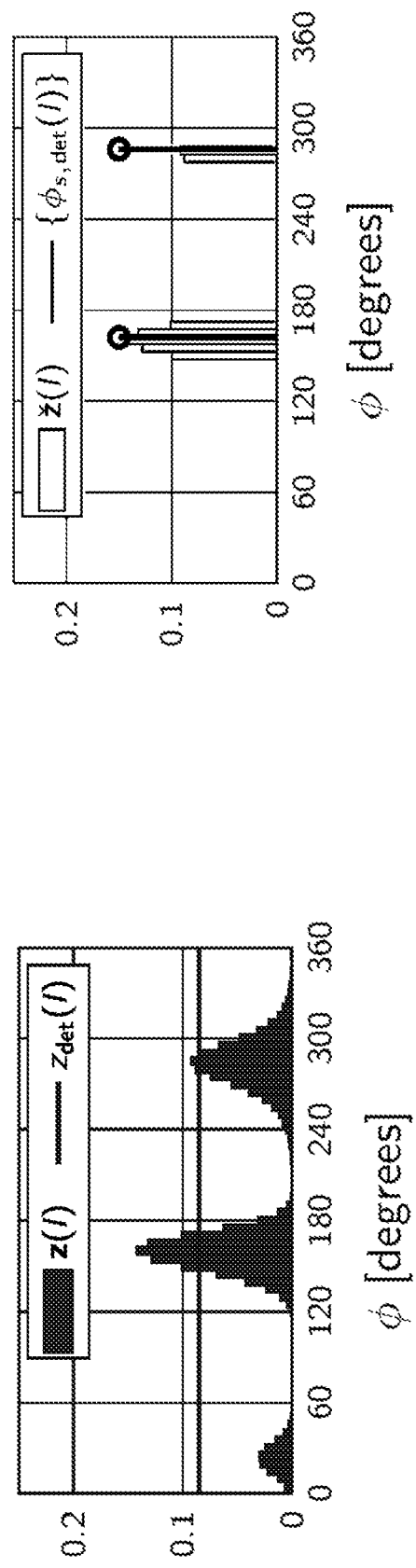
Fig. 6
Fig. 7

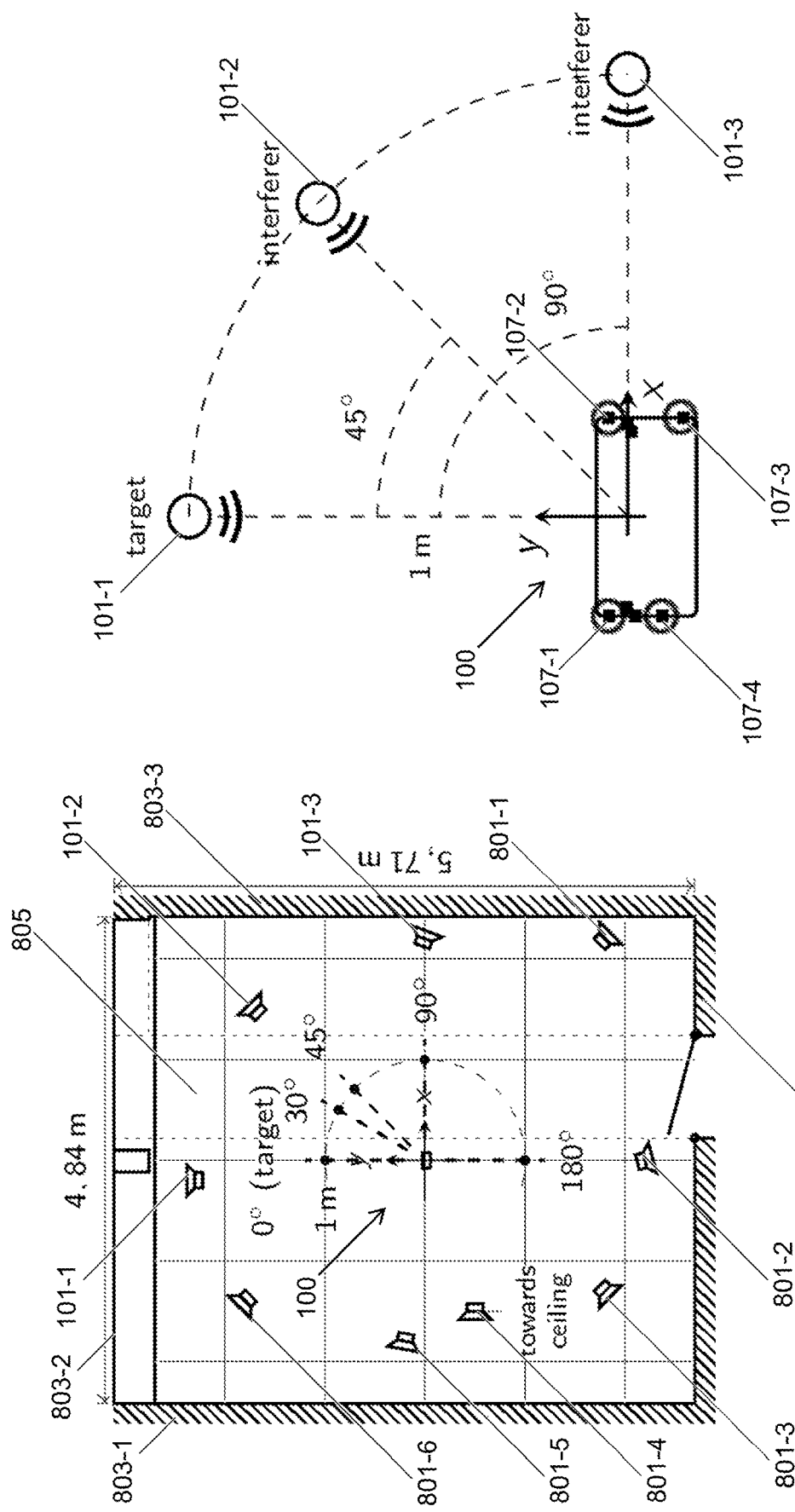

APPARATUS FOR DETERMINING SPATIAL POSITIONS OF MULTIPLE AUDIO SOURCES

CROSS-REFERENCE TO RELATED APPLICATIONS

This application is a continuation of International Application No. PCT/EP2019/069926, filed on Jul. 24, 2019, the disclosure of which is hereby incorporated by reference in its entirety.

FIELD

The present disclosure relates to the field of audio signal processing. In particular, the present disclosure relates to the localization and tracking of acoustic sources in mobile devices for acoustic sources in multi moving audio sources scenarios.

BACKGROUND

Known multisensor-multitarget localization and tracking apparatus typically perform some form of data association, assigning observations to tracks which represent targets of interest. Popular methods include Joint Probabilistic Data Association (JPDA) filters, Multiple Hypothesis Tracking (MHT), and Probabilistic Multiple Hypothesis Tracking (PMHT). MHT is fundamentally a deferred decision logic, i.e., the method builds a tree of data association hypotheses to be resolved at a later time when enough data is available to resolve the uncertainty. However, the memory and computational requirements for storing and managing the hypothesis tree can be very high and exceed the resources of a mobile devices.

Furthermore, the explicit modelling of spawning and dying of sources, as well as the splitting and merging of tracks can introduce additional complexity. Alternatively, a Probability Hypothesis Density (PHD) filter and its extensions for extended targets can be used, wherein in practice approximations can be necessary to reduce the computational complexity. PHD and MHT might suffer from similar data association problems and their requirements regarding memory and computational power can prevent them from being efficiently implemented in hand-held mobile devices with limited computational resources and power delivery.

Multi target tracking (MTT) algorithms typically need to address various types of source motion, e.g., regular motion, death, spawning, creation and merging. In addition, a source may have an arbitrary number of observations, including the case of no observations associated with them in each time frame and some observations might not correspond to any source and may need to be regarded as noise or clutter. These issues are further compounded by the requirement of data association between sources and observations as well as non-linear motion models. Conventional multi target tracking can be computationally expensive and conflict with the restrictions imposed by mobile devices, i.e., limited processing power and power consumption.

Thus, the inventors have recognized that there is a need for an improved apparatus and method for determining a spatial position of an audio source in multi moving audio sources scenarios.

SUMMARY

Aspects of the present disclosure provide an improved apparatus for determining a spatial position of an audio source in multi moving audio sources scenarios.

According to a first aspect, the disclosure relates to an apparatus for determining a spatial position of an audio source in multi moving audio sources scenarios, the audio source being configured to transmit an audio signal, wherein the audio signal is emittable as a sound wave by the audio source. The apparatus comprises a plurality of audio signal inputs, wherein each audio signal input is configured to receive an audio signal version in the form of a local sound wave of the emitted sound wave.

Furthermore, the apparatus comprises a processing circuitry which is configured to determine a first probability for a direction of arrival of the audio signal version and a second probability for the direction of arrival of the audio signal version upon the basis of the plurality of the audio signal versions received within a first time interval. The direction of arrival is associated with a first spatial position relative to the apparatus.

The processing circuitry is further configured to determine a third probability for the direction of arrival of the audio signal version and a fourth probability for the direction of arrival of the audio signal version upon the basis of the plurality of the audio signal versions received within a second time interval. This direction of arrival is associated with a second spatial position.

Furthermore, the processing circuitry is configured to determine a first probability difference between the first probability and the third probability, and to determine a second probability difference between the second probability and the fourth probability.

Additionally, the processing circuitry is configured to combine the third probability and the first probability difference to obtain an updated third probability, and to combine the fourth probability with the second probability difference to obtain an updated fourth probability. The processing circuitry is further configured to determine the certain spatial position upon the basis of the updated third probability and the updated fourth probability.

Thus, an improved apparatus for determining a spatial position of an audio source is provided, which is capable of determining a spatial position from a plurality of received audio signal versions. The improved apparatus offers an efficient low-complexity approach to MTT.

The spatial position can be a relative position with regard to the apparatus, wherein the apparatus is positioned at the center of the reference system and the spatial position comprises an azimuth angle, a polar angle, and/or a distance between the audio source and the apparatus.

The audio source can be a person or electronic speaker emitting a voice signal, wherein the audio source can approximately be represented by a point-like audio source. Each audio signal input can be configured to receive a time-discrete and/or amplitude-discrete audio signal version.

The first probability and the third probability correspond to a direction of arrival, which is associated with the first spatial position and the second probability and the fourth probability correspond to a direction of arrival, which is associated with the second spatial position. The first direction of arrival respectively spatial position is distinct from the second direction of arrival respectively spatial position. The probability for a direction of arrival corresponds to a single probability value for a single direction of arrival.

In a further possible implementation, the processing circuitry is configured to weight the first spatial position with the updated third probability and to weight the second spatial position with the updated fourth probability, and to determine the certain spatial position upon the basis of the weighted first and second spatial position. This provides the advantage of determining a spatial position of the audio source based on a prior estimation of the spatial position of the audio source can be achieved. In particular, a plurality of probabilities of the direction of arrival which are each weighted by a previous probability for the respective direction of arrival can be used to determine the most likely direction of arrival, respectively the most likely spatial position, of the audio source.

In a further possible implementation, the processing circuitry is configured to select the first or the second spatial position as the certain spatial position or to determine an average spatial position by determining an average of the first and second spatial position. The average can be weighted, especially by the probability values, to increase the precision and/or probability of determining the true direction of arrival, respectively the true spatial position of the audio source. Furthermore, the averaging can include at least one previously determined spatial position of the audio source to include a temporal memory to the averaging and/or to implement a moving average, in particular a time dependent moving average in the process of determining the current spatial position of the audio source. Thereby, intermittently disappearing audio sources and/or moving audio sources can be tracked with greater accuracy.

In a further possible implementation, the processing circuitry is configured to apply a decay factor to each probability. This provides the advantage that spuriously detected sources can be steadily decreased over time and eventually fall below a detection threshold value.

In a further possible implementation, the processing circuitry is configured to set the decay factor based on a sample frequency and/or hop size of the received version of the audio signal. This provides the advantage that the decay of a probability value can be tuned to meet a predetermined decay requirement, i.e. to implement a predetermined decay over time which can be dependent on a length of an audio signal sample and/or a sampling frequency of the audio signal. Especially a decay of the probability below a detection threshold value within a predetermined number of audio signal samples can be achieved.

In a further possible implementation the processing circuitry is configured to apply a first gain-factor to the third probability, wherein the first gain-factor comprises a constant value and a dynamic value, wherein the dynamic value is based upon the difference of the first probability and the third probability and/or the complement of the first probability, and wherein the processing circuitry is configured to apply a second gain-factor to the fourth probability, wherein the second gain-factor comprises the constant value and another dynamic value, wherein the another dynamic value is based upon the difference of the second probability and the fourth probability.

In particular, the gain factor can be composed as $\Delta z(l) \cdot \alpha_{inc}$, wherein $\Delta z(l)$ is the difference of a vector comprising the first probability and the second probability and a further vector comprising the third probability and the fourth probability, and wherein $\alpha_{inc}$ represents a constant gain factor, preferably in the range $0<\alpha_{inc}<1$. Thereby, the increase of the current probability values can be based on previously determined probability values, wherein the impact of the difference to the previously determined probabilities can be adjusted via the constant component $\alpha_{inc}$.

In a further possible implementation, the apparatus comprises at least four microphones, wherein each microphone is connected to a dedicated audio signal input of the plurality of audio signal inputs, wherein the microphones are arranged in a spatial array to detect audio sources in a three-dimensional space. The microphones can, for example, be arranged in a plane or at the corners of a tetraeder, wherein the relative distance between the microphones is known and fixed. This provides the advantage that a predetermined, and in particular fixed phase shift between the audio signal versions captured by the respective microphone can be realized. Furthermore, the microphones can have a directional sensitivity, wherein each microphone is oriented in such a way, that the direction of maximum sensitivity is different for each microphone. In a further possible implementation, the microphones are omnidirectional with a reduced level of directional sensitivity.

In a further possible implementation, the processing circuitry is configured to determine a plurality of probabilities for a direction of arrival of the audio signal upon the basis of the plurality of the audio signal versions received within a time interval, wherein the direction of arrival is discretized and associated with the azimuth angle. The plurality of probabilities for a direction of arrival of the audio source can form a one-dimensional, two-dimensional or three-dimensional direction (DOA) of arrival likelihood matrix, in particular a DOA likelihood vector. The index of each vector element can correspond to a discretized coordinate value, in particular to the discretized azimuth angle, wherein the azimuth angle can be resolved in integer values of 1° intervals. Furthermore, the processing circuitry can be configured to determine separate DOA likelihood vectors for separate coordinates, i.e. x-, -y and z-likelihood vectors (cartesian coordinates) or $\varphi$-, $\theta$-r-likelihood vectors (spherical coordinates).

In a further possible implementation, the processing circuitry is configured to remove any probabilities which are smaller than a probability threshold value from the plurality of probabilities to separate the plurality of probabilities into sets of spatially contiguous non-zero probabilities.

In a further possible implementation, the processing circuitry is configured to determine an average spatial position for each set of spatially contiguous non-zero probabilities. This provides the advantage that each set of spatially contiguous non-zero probabilities can represent a detected audio source, wherein the true spatial position of the audio source lies within the range of direction of arrivals covered by the respective set of spatially contiguous non-zero probabilities. The average of the respective set of spatially contiguous non-zero probabilities can be the most likely true direction of arrival of the audio signal received from the audio source, wherein the average value can be weighted by the probability values of each respective direction of arrival within the set of spatially contiguous non-zero probabilities.

In a further possible implementation, the processing circuitry is configured to weight each average spatial position based upon the probabilities of each set. This provides the advantage that the position of the audio source with a maximum likelihood can be determined. Especially when the set probabilities only contains a single probability peak.

In a further possible implementation, the processing circuitry is configured to calculate the probability threshold value based upon the plurality of probabilities. This provides the advantage that directions of arrival with a probability below the probability threshold can be discarded. Furthermore, a group of contiguous probability value can be broadened or narrowed by lowering respectively increasing the probability threshold.

In a further possible implementation, the processing circuitry is configured to determine a detection quantile of the plurality of probabilities, wherein the detection quantile includes a predefined percentage of the plurality of probabilities constituting the highest probability values of the plurality of probabilities, and wherein the processing circuitry is configured to determine the probability threshold value to produce the detection quantile with the predefined percentage of the plurality of probabilities.

The detection quantile can include a predetermined number of DOA probability values of the plurality of probability values. Furthermore, the probability threshold can by chosen so as to include a predetermined number of direction of arrival probability values in the detection quantile. For example, the detection quantile can include a percentage of the plurality of probabilities representing the highest probabilities. Preferably the detection quantile includes a percentage in the range from 5% to 25% of the highest probability values.

In a further possible implementation, the processing circuitry is configured to determine a number of separate signal sources from the number of sets of spatially contiguous non-zero probabilities. In particular, each set of spatially contiguous non-zero probabilities above the probability threshold value represent a single audio source or a group of audio sources, which cannot be separated into single audio sources. Each audio source of the group of audio sources can be positioned so that a relative distance to the nearest audio source with respect to the direction of arrival at the apparatus is below a separation threshold distance. Thus, the audio sources are indistinguishable, and a joint direction of arrival is estimated for the group of audio sources. The processing circuitry can be configured to separate the audio sources of the group of audio sources by applying a peak finding method to the set of spatially contiguous non-zero probabilities. If two or more peaks are detected, it is possible that two audio sources are present within the set of spatially contiguous non-zero probabilities. However, additional peaks within the set can also represent echoes of a single true audio source.

In a further possible implementation, the processing circuitry is configured to update the first probability respectively the second probability with a probability value of zero as a previous probability if no respective previous probability was determined to remove prior audio source detections and reset prior audio source knowledge.

According to a second aspect the disclosure relates to a mobile device for telecommunications services, comprising an apparatus for determining a certain spatial position of an audio source, the audio source being configured to transmit an audio signal, the apparatus comprising: a plurality of audio signal inputs, wherein each audio signal input is configured to receive an audio signal version of the transmitted audio signal; a processing circuitry which is configured to determine a first probability for a direction of arrival of the audio signal version and a second probability for the direction of arrival of the audio signal version upon the basis of the plurality of the audio signal versions received within a first time interval, the direction of arrival being associated with a first spatial position relative to the apparatus; the processing circuitry being further configured to determine a third probability for the direction of arrival of the audio signal version and a fourth probability for the direction of arrival of the audio signal version upon the basis of the plurality of the audio signal versions received within a second time interval, the direction of arrival being associated with a second spatial position; the processing circuitry being further configured to determine a first probability difference between the first probability and the third probability and to determine a second probability difference between the second probability and the fourth probability; wherein the processing circuitry is configured to combine the third probability and the first probability difference to obtain an updated third probability, and to combine the fourth probability with the second difference to obtain an updated fourth probability; and wherein the processing circuitry is configured to determine the certain spatial position upon the basis of the updated third probability and the updated fourth probability;

Furthermore, the mobile device comprises a microphone array, which is configured to capture audio signals, wherein the microphone array is connected to the plurality of signal inputs to provide the audio signals to the processing circuitry. In a further possible implementation, the microphone array comprises four microphones, which are disposed in a plane forming a quadrangular shape.

BRIEF DESCRIPTION OF THE DRAWINGS

Embodiments of the disclosure will be described with respect to the following figures, in which:

FIG. 2 shows a schematic diagram of a method corresponding to the apparatus for determining a spatial position of an audio source;

FIG. 3 shows a schematic diagram of a previous DOA likelihood vector and an element wise decayed current DOA likelihood vector;

FIG. 4 shows a schematic diagram of two instances of the DOA likelihood vector determined by the DOA algorithm;

FIG. 5 shows a schematic diagram of the DOA likelihood difference term $\Delta z(l)$;

FIG. 6 shows a schematic diagram of the DOA likelihood vector and a threshold value;

FIG. 7 shows a schematic diagram of the masked DOA likelihood vector $\check{z}(l)$ and the average DOA $\varphi_{s,\,det}(l)$ for two contiguous ranges of DOA likelihood vector elements;

FIG. 8 shows a schematic diagram of an audio source environment with the apparatus according to an embodiment;

FIG. 9 shows a schematic diagram of the apparatus and three audio sources according to an embodiment;

DETAILED DESCRIPTION

In the following description, reference is made to the accompanying drawings, which form part of the disclosure, and in which are shown, by way of illustration, exemplary aspects in which the present invention may be practiced. It is understood that other aspects may be utilized, and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding communication transmitter or communication receiver configured to perform the method, and vice versa. For example, if a specific method step is described, a corresponding communication transmitter or communication receiver may include a processor and/or communication interface to perform the described method step, even if such unit is not explicitly described or illustrated in the figures. Further, it is understood that the features of the various exemplary aspects described herein may be combined with each other, unless specifically noted otherwise.

Figure 1:
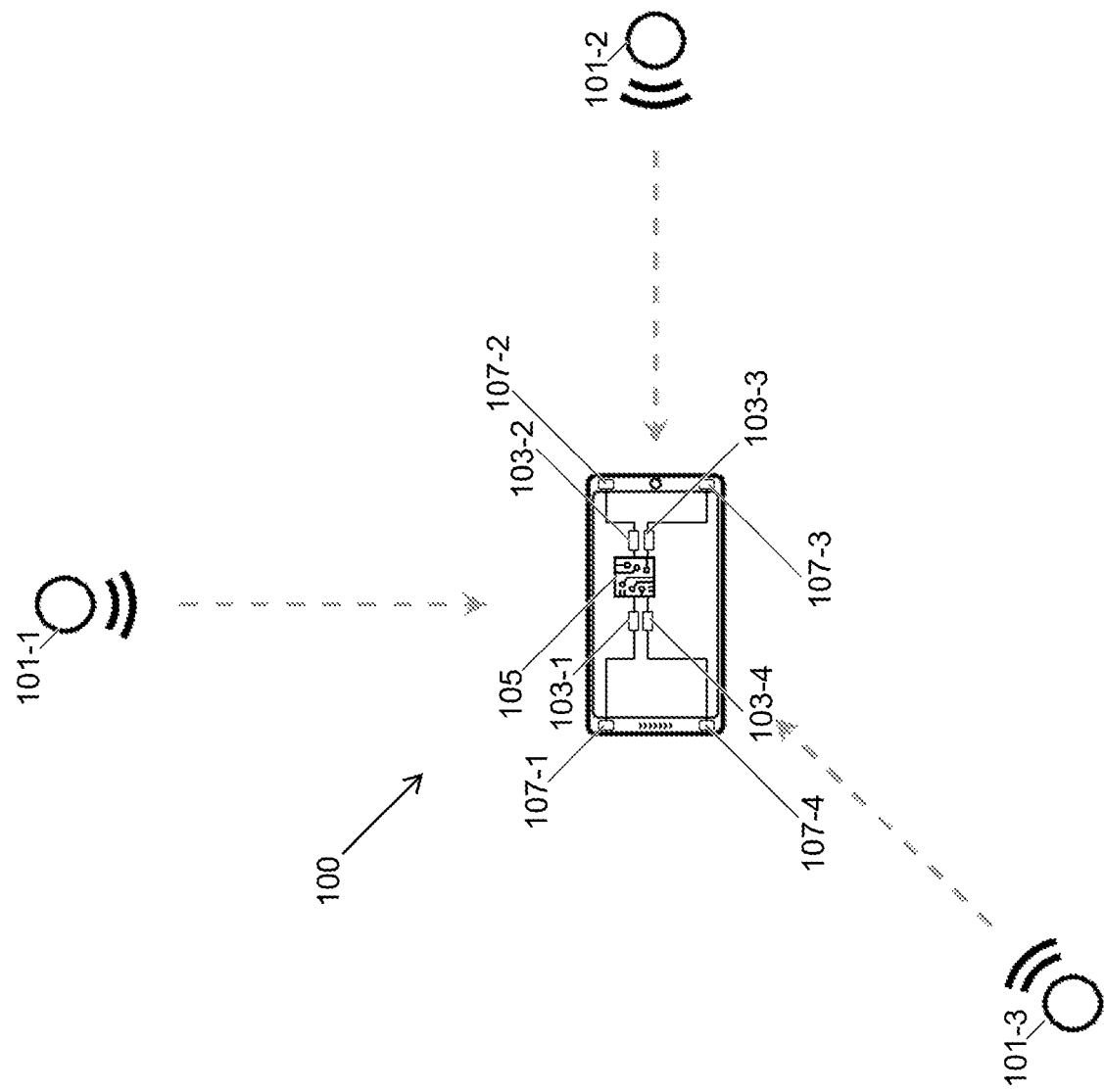
FIG. 1 shows a schematic diagram of an apparatus for determining a spatial position of an audio source.

FIG. 1 shows a schematic diagram of an apparatus 100 for determining a spatial position of an audio source 101-1 in multi moving audio sources scenarios, wherein the audio source 101-1 is configured to transmit an audio signal, wherein the audio signal is emittable as a sound wave by the audio source. The apparatus 100 comprises four audio signal inputs 103-1, 103-2, 103-3, 103-4, wherein each audio signal input 103-1, 103-2, 103-3, 103-4 is configured to receive an audio signal version in the form of a local sound wave of the emitted sound wave.

Furthermore the apparatus 100 comprises processing circuitry. The processing circuitry may comprise hardware and software. The hardware may comprise digital circuitry, or both analog and digital circuitry. Digital circuitry may comprise components such as application-specific integrated circuits (ASICs), field-programmable arrays (FPGAs), digital signal processors (DSPs), or general-purpose processors. In one embodiment, the processing circuitry comprises one or more processors and a non-transitory memory connected to the one or more processors. The non-transitory memory may carry executable program code which, when executed by the one or more processors, causes the apparatus to perform the operations or methods described herein. In the example, the processing circuitry is a processor 105.

The processor 105 is configured to determine a first probability for a direction of arrival of the audio signal version and a second probability for the direction of arrival of the audio signal version upon the basis of the plurality of the audio signal versions received within a first time interval, the direction of arrival being associated with a first spatial position relative to the apparatus 100.

The processor 105 is further configured to determine a third probability for the direction of arrival of the audio signal version and a fourth probability for the direction of arrival of the audio signal version upon the basis of the plurality of the audio signal versions received within a second time interval, the direction of arrival being associated with a second spatial position. Additionally, the processor 105 is configured to determine a first probability difference between the first probability and the third probability and to determine a second probability difference between the second probability and the fourth probability.

The processor 105 is further configured to combine the third probability and the first probability difference to obtain an updated third probability, and to combine the fourth probability with the second probability difference to obtain an updated fourth probability, wherein the processor 105 is configured to determine the certain spatial position upon the basis of the updated third probability and the updated fourth probability.

FIG. 2 shows a schematic diagram of a method corresponding to the apparatus for determining a spatial position of an audio source. In a first step audio signals, in particular, microphone signals are processed by a direction of arrival (DOA) algorithm (e.g. GCC, SRP, MUSIC). The direction of arrival algorithm is configured to determine a DOA likelihood vector, which contains a set of direction of arrival probabilities for an audio source wherein each probability is linked to a location or at least one coordinate value of the audio source. The DOA likelihood vector is then recursively updated by a previous version of the DOA likelihood vector which has been determined at an early time. The updated DOA likelihood can be the basis for a quantile-based detection algorithm, wherein the quantile-based detection algorithm is configured to determine a set of detected audio sources. An audio signal version of each detected audio source can be present in the microphone signals.

FIG. 3 shows a schematic diagram of the DOA likelihood vector, wherein each vector element of the DOA likelihood vector represents an azimuthal direction with the spatial position of the apparatus as the origin. The azimuth angle can be uniformly discretized into $N_z$ prototype directions of arrival $$\theta_n = \frac{360}{N_z}(n-1), n \in \{1, \ldots, N_z\}.$$

For example, $N_z=360$ corresponds to an angular resolution of 1°. For each prototype DOA $\theta_n$, the probability of a source impinging on the microphone array from this direction in time frame 1 is estimated by the variable $z_n(l)$, which is limited to the range $0<z_n(l)<1$.

The DOA likelihood vector can be defined as $$z(l)=[z_1(l), \ldots, z_{N_z}(l)]^T, \quad (1)$$

which is recursively updated over time based on the selected DOA algorithm. The $z_n(l)$ can sum up to one and form a discrete probability density function.

In a possible implementation no prior knowledge of any source position is assumed, and the initial DOA likelihood vector consists of all zeros $z(0)=0$. The choice of zero instead of, e.g., a uniform distribution provides the advantage that initially there are no prior source detections which could decay.

Each DOA likelihood vector element can decay, in particular, exponentially and/or independent from all other elements:

$$\tilde{z}(l)=\alpha_{dec} \cdot z(l-1)$$

The parameter $0<\alpha_{dec}<1$ can control the rate of decay and, by proxy, the amount of time it takes for the DOA likelihoods to drop below a detection threshold value once the activity from a particular source has ceased. Thereby, the death of any audio source can be modeled implicitly. The parameter value $\alpha_{dec}$ can be chosen depending on parameters which control the block-wise processing of the audio signal, i.e., sampling frequency and hop size. Typical values of $\alpha_{dec}$ are close to 1, such that a detected peak in $z(l)$ does not decay below the detection threshold value within one time frame. This allows the system to retain the detected sources through signal absence periods like speech pauses.

FIG. 4 shows a schematic diagram of the DOA likelihood vector determined by the DOA algorithm at a first time, denoted by $z(l-1)$ and at a second time, denoted by $z(l)$. From $z(l-1)$ and $z(l)$ a difference term $$\Delta z(l)=[\Delta z_1(l) \ldots \Delta z_{N_z}(l)]^T,$$

can be obtained from the selected DOA algorithm. The DOA likelihood vector can be updated according to $$z(l) = \bar{z}(l) + (1 - \bar{z}(l)) \odot \Delta z(l) \cdot \alpha_{inc}$$

where $\odot$ denotes the Hadamard product (element-wise multiplication) of two vectors. Similar to $\alpha_{dec}$ for the decay, the parameter $0 < \alpha_{inc} < 1$ controls the rate of growth and, therefore, how fast appearing representations of audio sources in the audio signals are detected. On the other hand, it also determines the system's sensitivity to spuriously detected sources, e.g., due to strong incoherent noise. Consequently, this step implicitly models both the birth of sources as well as isolated misdetections and clutter. The choice of $\alpha_{inc}$ offers a trade-off between responsiveness and robustness and can be adjusted to obtain a desired system behavior.

Especially for a narrowband DOA algorithm $\Delta z(l)$ can be obtained by sampling the Wrapped Gaussian (WG) component of the fitted mixture model, after enforcing a minimum variance to avoid singularities when the pdf collapses onto a single data point. Alternatively, the discretized energy map of SRP-PHAT may be used directly as $\Delta z(l)$. Due to the overlapping support of successive $\Delta z(l)$ and $z(l-1)$ an implicit data association is carried out such that both steps, decay and rise, together allow for arbitrary regular source motion without assuming a particular motion model.

FIG. 5 shows a schematic diagram of the difference term $\Delta z(l)$. In a further advantageous embodiment, the difference term represents the difference between two consecutively determined DOA likelihood vectors, which are based on two consecutively recorded audio samples of the audio signals. In another embodiment the difference term can represent a weighted difference, wherein an average of a plurality of previous DOA likelihood vectors is subtracted from the current DOA likelihood vector. Thereby, the memory of the recursive update of the DOA likelihood vector can be increased to include audio source information reaching further back than the previous audio sample.

FIG. 6 shows a schematic diagram of the DOA likelihood vector $z(l)$ and a threshold value $z_{det}(l)$. To extract the number of acoustic sources and the DOA probabilities of these acoustic sources from the DOA likelihood vector a quantile-based threshold is applied to the DOA likelihood vector and a weighted average is applied to the remaining groups of contiguous DOA likelihood vector elements. The thresholding provides the advantage of improving the robustness against temporally isolated, spuriously detected audio sources, since the corresponding spurious peak in the DOA likelihood vector will remain below the threshold and therefore is not considered as a detected audio source. Furthermore, detected audio source DOAs can be retained through periods of audio signal absence from the detected DOA, since the detection mask is invariant under the uniform decay of the DOA likelihood vector $z(l)$.

A newly appearing audio source can cause a rapid change of the quantile-based threshold such that the detection mask will quickly reflect the location of the new audio source. Additionally, applying an absolute threshold in addition to the quantile-based threshold can lead to no sources being detected after prolonged silence periods, since $z(l)$ can decay enough to fall below the absolute threshold.

In cases where the audio source activity is highly dynamic, this can provide the advantage that sources without recent activity are quickly discarded.

In a possible implementation a $\alpha_{det}$-quantile $z_{det}(l)$ is computed from the values of the current DOA likelihood vector $z(l)$. The parameter $\alpha_{det}$ can be in the range from 0 to 1, wherein values for $\alpha_{det}$ in the range $0.75 < \alpha_{det} < 0.95$ are preferable to yield good audio source detection results. Retaining only those elements of $z(l)$ that exceed $z_{det}(l)$ yields a masked DOA likelihood vector $\check{z}(l)$. Adjacent non-zero elements of $\check{z}(l)$ are considered a "contiguous range" and constitute a single detected source. The first and last element of $\check{z}(l)$ are also treated as adjacent to cover the angular wrapping at 360°. The indices of the DOA likelihood vector elements associated with the s-th contiguous range are collected in the index set $\mathcal{A}_s(l)$, $s \in \{1, \ldots, \hat{N}_s(l)\}$, where $\hat{N}_s(l)$ denotes the number of contiguous ranges. $\hat{N}_s(l)$ represents an estimate of the number of audio sources.

FIG. 7 shows a schematic diagram of the masked DOA likelihood vector $\check{z}(l)$ and the average DOA $\varphi_{s,det}(l)$ for two contiguous ranges of DOA likelihood vector elements. The DOA of each detected audio source can be computed by a weighted average $$\phi_{s,det}(l) = \left( \frac{\sum_{n \in \mathcal{A}_s(l)} z_n(l) \cdot \left( (\theta_n - \vartheta(l)) \bmod 360 \right)}{\sum_{n \in \mathcal{A}_s(l)} z_n(l)} + \vartheta(l) \right) \bmod 360, \quad (5)$$

where $$\vartheta(l) = \min_{n \notin \bigcup_k \mathcal{A}_s(l)} \theta_n \quad (6)$$

is the first prototype DOA that is not associated with any detected source. Combined with the modulo operator (mod 360), the weighted average can produce the expected result even if one index set covers the seam from 360° to 0°. This detection method readily handles the merging of sources. As the corresponding peaks in the DOA likelihood vector move closer and eventually overlap, two contiguous ranges turn into a single range resulting in one detected audio source. The same holds for the splitting respectively spawn of audio sources. Thus, a combination of the recursive DOA likelihood vector update and the quantile-based detection can address all aspects of MTT of audio source evolution over time.

FIG. 8 shows a schematic diagram of an audio source environment with the apparatus 100, which is oriented parallel to the drawing plane and wherein a plurality of audio sources 101-1 to 101-3 and 801-1 to 801-6 is placed randomly in a room 805 with hard, reflective walls 803-1 to 803-4. The reverberation time of the room 805 can be, for example, $T_{60} \approx 400$ ms. The apparatus 100 comprises 4 microphones, wherein each microphone is connected to a dedicated audio signal input of the plurality of audio signal inputs, wherein the microphones are arranged in a spatial array to detect the audio sources 101-1 to 101-3 and 801-1 to 801-6 in a three-dimensional space.

In a further advantageous implementation, up to three simultaneously active point audio sources 101-1 to 101-3 are considered. Their signals can consist of male speech, female speech and music, respectively, and can have a duration of 65 s. An initial period of 3 s, in which only the target audio source 101-1 is active, is included to obtain an initial estimate for the target DOA trajectory. In all scenarios, background noise created by superposition of nine separate speech recordings is added at varying Signal-to-Noise Ratio (SNR) levels ranging from +30 dB to −10 dB. For each recording, a loudspeaker of an audio source which is facing away from the apparatus 100 can emit a different speech signal consisting of random utterances. A different human speaker (both male and female) and a different set of utterances can be chosen for each of the nine audio signals of the audio sources 101-1 to 101-3 and 801-1 to 801-6. An accurate estimate of the target audio source 101-1 is crucial for the operation of the apparatus 100.

FIG. 9 shows a schematic diagram of the apparatus 100 and three audio sources 101-1, 101-2, 101-3. The apparatus 100 comprises four microphones 107-1, 107-2, 107-3, 107-4, wherein each microphone 107-1, 107-2, 107-3, 107-4 is connected to a dedicated audio signal input of the plurality of audio signal inputs. The microphones 107-1, 107-2, 107-3, 107-4 are arranged in a spatial array, in particular a quadrangular shape, to detect the audio sources 101-1, 101-2, 101-3 in a three-dimensional space. The audio sources 101-1, 101-2 and 101-3 are positioned at a distance of 1 m from the geometric center of the microphone array. Each audio source 101-1, 101-2, 101-3 is oriented towards the apparatus 100. The direction of arrival for the audio source 101-1 is 0°, the direction of arrival for the audio source 101-2 is 450 and the direction of arrival for the audio source 101-3 is 90°.

Figure 10:
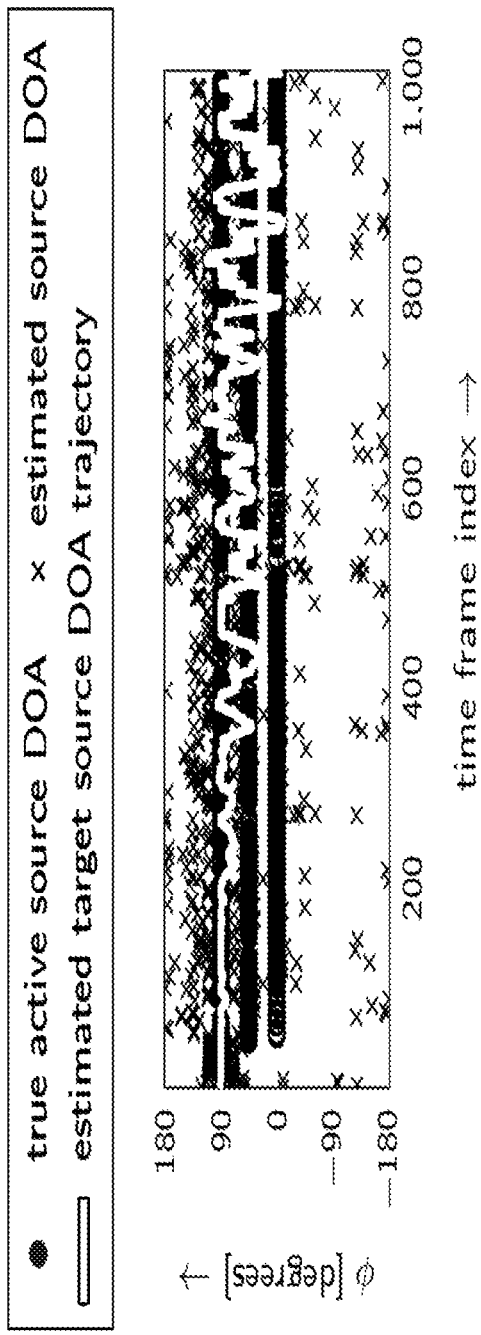
FIG. 10 shows a schematic diagram of detected directions of arrival and the target source DOA trajectories for the SRP-PHAT method.

FIG. 10 shows a schematic diagram of detected directions of arrival and the target audio source DOA trajectories for the SRP-PHAT method. The audio sources are arranged according to the embodiment shown in FIG. 9. The estimated target audio source DOA trajectory (x) represents the estimated direction of arrival over time of the audio source 101-1 as shown in FIG. 9. The true active source DOA trajectories (●) represent the audio source 101-2 at an azimuthal DOA of φ=450 and the audio source 101-3 at an azimuthal DOA of φ=90°. The azimuthal DOA of the target audio source is φ=0°.

Figure 11:
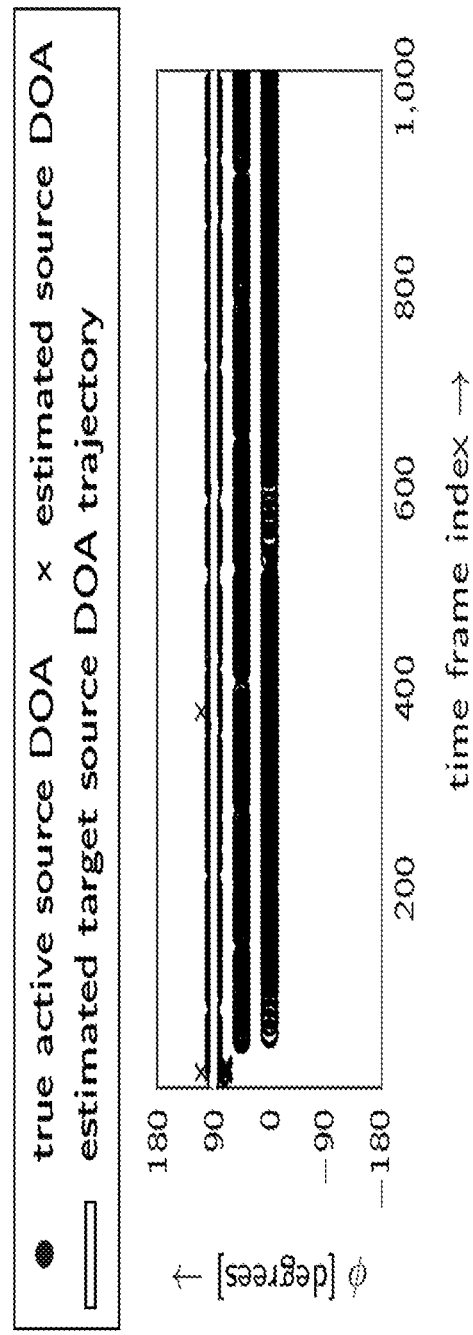
FIG. 11 shows a schematic diagram of detected directions of arrival and the target source DOA trajectories for the estimated audio source trajectory output by the apparatus according to an embodiment.

FIG. 11 shows a schematic diagram of detected directions of arrival and the target audio source DOA trajectories for the estimated audio source trajectory output by the apparatus using the SRP-PHAT method for determining the initial DOA likelihood vector. The audio sources are arranged according to the embodiment shown in FIG. 9. The estimated target source DOA trajectory (x) represents the estimated direction of arrival over time of the audio source 101-1 as shown in FIG. 9. The true active source DOA trajectories (●) represent the audio source 101-2 at an azimuthal DOA of φ=450 and the audio source 101-3 at an azimuthal DOA of φ=90°. The azimuthal DOA of the target audio source is φ=0°. In comparison to the known SRP-PHAT method according to the embodiment shown in FIG. 10 the apparatus is capable of clearly separating the audio sources and maintain a consistent lock regarding the estimated target audio source DOA at φ=90°. Both FIG. 10 and FIG. 11 show the detected audio source directions of arrival and the target audio source direction of arrival trajectories at a fixed SNR log=0 dB. The method incorporated by the apparatus exhibits significantly less outliers and spatial aliasing artifacts than the SRP-PHAT method and produces a more accurate audio source DOA trajectory.

Figure 12:
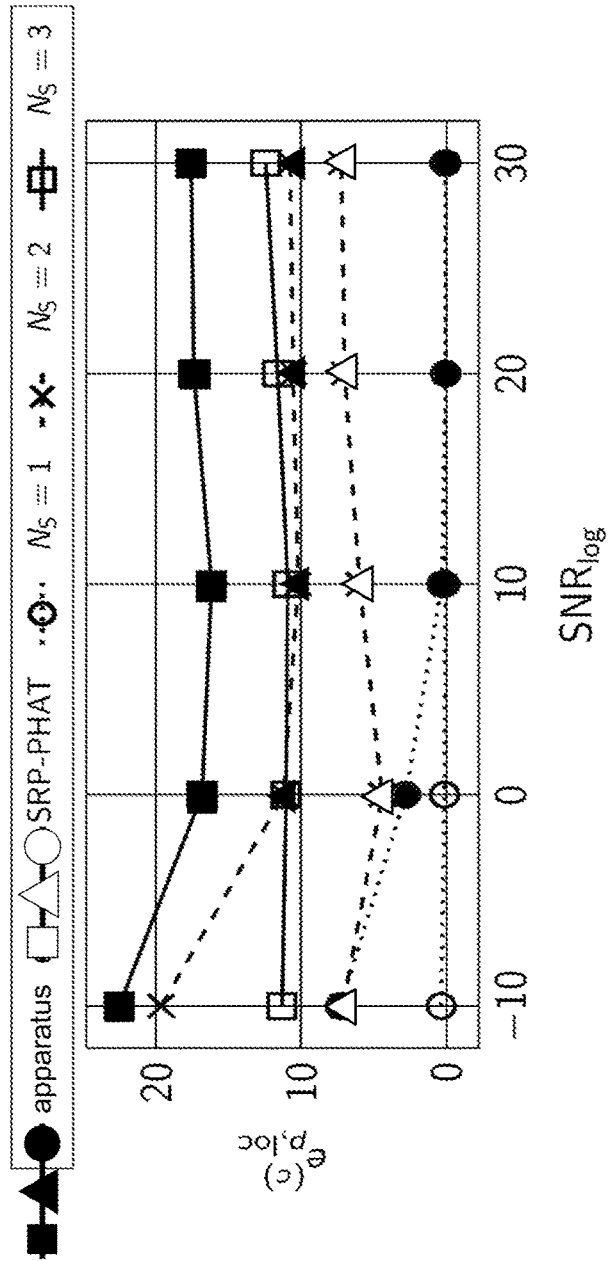
FIG. 12 shows a schematic diagram of the Optimum Subpattern Assignment (OSPA) results for different numbers of audio sources $N_s$ and $SNR_{log}$ values.

FIG. 12 shows a schematic diagram of the Optimum Subpattern Assignment (OSPA) results for different numbers of audio sources $N_s$ and $SNR_{log}$ values. OSPA can be used to assess the performance of multi-object filters. In multi-object estimation, the OSPA metric may be interpreted as a per-object error comprised of two components $e_{p,\,loc}^{(c)}$ and $e_{p,\,card}^{(c)}$ accounting for localization and cardinality errors respectively. The parameters of the OSPA metric are chosen as p=2 and c=90. The method implemented by the apparatus outperforms SRP-PHAT consistently in terms of localization error, with larger improvements as the source number $N_s$ increases. The OSPA metric $d_p^{(c)}$ and the cardinality error $e_{p,\,card}^{(c)}$ are given in table 1.

TABLE 1

OSPA localization results for different number of audio sources $N_s$ and $SNR_{log}$ values

| Scenario | | Method | $d_p^{(c)}$ | $e_{p,card}^{(c)}$ | $e_{p,loc}^{(c)}$ |
|---|---|---|---|---|---|
| $N_s = 3$ | $SNR_{log} = 30$ dB | SRP-PHAT | 49.8 | 36.7 | 17.6 |
| | | proposed | 46.9 | 37.4 | 12.4 |
| | $SNR_{log} = 20$ dB | SRP-PHAT | 49.6 | 36.6 | 17.4 |
| | | proposed | 47.4 | 38.4 | 11.6 |
| | $SNR_{log} = 10$ dB | SRP-PHAT | 50.0 | 38.1 | 16.2 |
| | | proposed | 47.8 | 39.0 | 10.9 |
| | $SNR_{log} = 0$ dB | SRP-PHAT | 52.8 | 40.6 | 16.8 |
| | | proposed | 49.0 | 40.0 | 11.1 |
| | $SNR_{log} = -10$ dB | SRP-PHAT | 60.6 | 44.7 | 22.5 |
| | | proposed | 52.6 | 43.8 | 11.3 |
| $N_s = 2$ | $SNR_{log} = 30$ dB | SRP-PHAT | 49.1 | 40.9 | 10.7 |
| | | proposed | 46.5 | 40.0 | 7.21 |
| | $SNR_{log} = 20$ dB | SRP-PHAT | 48.9 | 40.8 | 10.5 |
| | | proposed | 46.1 | 39.8 | 6.99 |
| | $SNR_{log} = 10$ dB | SRP-PHAT | 47.9 | 39.9 | 10.2 |
| | | proposed | 45.7 | 40.3 | 5.96 |
| | $SNR_{log} = 0$ dB | SRP-PHAT | 51.7 | 43.3 | 11.2 |
| | | proposed | 43.8 | 39.8 | 4.42 |
| | $SNR_{log} = -10$ dB | SRP-PHAT | 61.3 | 46.2 | 19.6 |
| | | proposed | 53.5 | 47.9 | 7.01 |
| $N_s = 1$ | $SNR_{log} = 30$ dB | SRP-PHAT | 70.5 | 70.5 | 0.0426 |
| | | proposed | 73.4 | 73.4 | 0.101 |
| | $SNR_{log} = 20$ dB | SRP-PHAT | 67.6 | 67.5 | 0.0615 |
| | | proposed | 71.8 | 71.8 | 0.0601 |
| | $SNR_{log} = 10$ dB | SRP-PHAT | 60.1 | 59.9 | 0.314 |
| | | proposed | 70.7 | 70.7 | 0.0843 |
| | $SNR_{log} = 0$ dB | SRP-PHAT | 59.8 | 58.1 | 2.82 |
| | | proposed | 62.8 | 62.8 | 0.317 |
| | $SNR_{log} = -10$ dB | SRP-PHAT | 70.8 | 66.2 | 7.28 |
| | | proposed | 70.0 | 69.8 | 0.367 |

Figure 13:
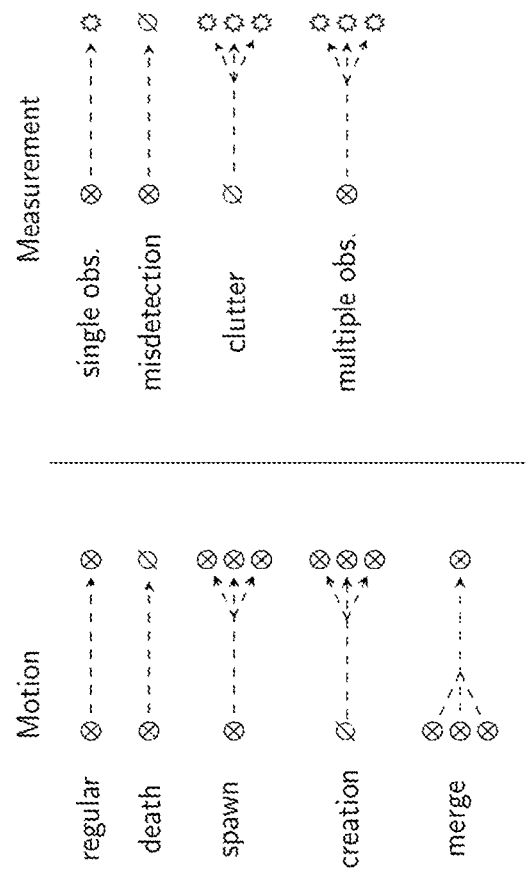
FIG. 13 depicts a schematic diagram of possible audio source evolution over time and measurement obstacles when detecting an audio source.

FIG. 13 depicts a schematic diagram of possible audio source evolution over time and measurement obstacles when detecting an audio source. An audio source can move relative to the apparatus. An audio source which has previously transmitted an audio signal can cease to transmit the audio signal. An audio source can split into a plurality of audio sources and a plurality of audio sources can be created simultaneously. Furthermore, a plurality of audio sources can merge into a single audio source.

A regular capture of an audio signal transmitted by an audio source consists of a single observation from a true direction of arrival of the audio source. During the capture of a transmitted audio signal an audio signal version can have intermittent gaps, where no audio signal is recorded, which could lead to the audio source being dropped from the index of detected sources, if the respective DOA likelihood vector elements decay below the detection threshold. Furthermore, multiple audio sources can be detected simultaneously or a single audio source can appear as multiple separate sources, for example, by means of acoustic reflections.

REFERENCE SIGNS

100 Apparatus
101-1 Audio source
101-2 Audio source
101-3 Audio source
103-1 First audio signal input
103-2 Second audio signal input
103-3 Third audio signal input
103-4 Fourth audio signal input
105 Processor
107-1 First microphone
107-2 Second microphone 107-3 Third microphone
107-4 Fourth microphone
801-1 Audio source
801-2 Audio source
801-3 Audio source
801-4 Audio source
801-5 Audio source
801-6 Audio source
803-1 Wall
803-2 Wall
803-3 Wall
803-4 Wall
805 Room

What is claimed is:

1. An apparatus for determining a spatial position of an audio source in multi moving audio sources scenarios, the audio source being configured to transmit an audio signal, wherein the audio signal is emittable as a sound wave by the audio source, the apparatus comprising:
a plurality of audio signal inputs, wherein each audio signal input is configured to receive an audio signal version in the form of a local sound wave of the emitted sound wave; and
processing circuitry which is configured to:
determine a first probability for a direction of arrival of the audio signal version and a second probability for the direction of arrival of the audio signal version upon the basis of the plurality of the audio signal versions received within a first time interval, the direction of arrival being associated with a first spatial position relative to the apparatus;
determine a third probability for the direction of arrival of the audio signal version and a fourth probability for the direction of arrival of the audio signal version upon the basis of the plurality of the audio signal versions received within a second time interval, the direction of arrival being associated with a second spatial position;
determine a first probability difference between the first probability and the third probability;
determine a second probability difference between the second probability and the fourth probability;
combine the third probability and the first probability difference to obtain an updated third probability;
combine the fourth probability with the second probability difference to obtain an updated fourth probability; and
determine the certain spatial position upon the basis of the updated third probability and the updated fourth probability.

2. The apparatus according to claim 1, wherein the processing circuitry is configured to weight the first spatial position with the updated third probability, to weight the second spatial position with the updated fourth probability, and to determine the certain spatial position upon the basis of the weighted first and second spatial position.

3. The apparatus according to claim 2, wherein the processing circuitry is configured to select the first spatial position or the second spatial position as the certain spatial position or to determine an average spatial position by determining an average of the first spatial position and the second spatial position.

4. The apparatus according to claim 1, wherein the processing circuitry is configured to apply a decay factor to each probability.

5. The apparatus according to claim 4, wherein the processing circuitry is configured to set the decay factor based on a sample frequency or hop size of the received version of the audio signal.

6. The apparatus according to claim 1,
wherein the processing circuitry is configured to apply a first gain-factor to the third probability,
wherein the first gain-factor comprises a constant value and a dynamic value,
wherein the dynamic value is based upon the difference of the first probability and the third probability or the complement of the first probability,
wherein the processing circuitry is configured to apply a second gain-factor to the fourth probability,
wherein the second gain-factor comprises the constant value and another dynamic value, and
wherein the another dynamic value is based upon the difference of the second probability and the fourth probability.

7. The apparatus according to claim 1, comprising at least four microphones, wherein each of the microphones is connected to a dedicated audio signal input of the plurality of audio signal inputs, wherein the microphones are arranged in a spatial array to detect audio sources in a three-dimensional space.

8. The apparatus according to claim 1, wherein the processing circuitry is configured to determine a plurality of respective probabilities for a direction of arrival of the audio signal upon the basis of the plurality of the audio signal versions received within a respective time interval, wherein the direction of arrival is discretized and associated with the azimuth angle, wherein the plurality of respective probabilities comprises the first probability, the second probability, the third probability, and the fourth probability, and the respective time interval comprises the first time interval and the second time interval.

9. The apparatus according to claim 8, wherein the processing circuitry is configured to remove any of the probabilities which are smaller than a probability threshold value from the plurality of probabilities to separate the plurality of probabilities into sets of spatially contiguous non-zero probabilities.

10. The apparatus according to claim 9, wherein the processing circuitry is configured to determine an average spatial position for each set of spatially contiguous non-zero probabilities.

11. The apparatus according to claim 9, wherein processing circuitry is configured to weight each average spatial position based upon the probabilities of each set.

12. The apparatus according to claim 9, wherein the processing circuitry is configured to calculate the probability threshold value based upon the plurality of probabilities.

13. The apparatus according to claim 9,
wherein the processing circuitry is configured to determine a detection quantile of the plurality of probabilities,
wherein the detection quantile includes a predefined percentage of the plurality of probabilities constituting the highest probability values of the plurality of probabilities, and
wherein the processing circuitry is configured to determine the probability threshold value to produce the detection quantile with the predefined percentage of the plurality of probabilities.

14. The apparatus according to claim 9, wherein the processing circuitry is configured to determine a number of separate signal sources from the number of sets of spatially contiguous non-zero probabilities.

15. The apparatus according to claim 1, wherein the processing circuitry is configured to respectively update the first probability and the second probability with a probability value of zero as a previous probability based upon determining that no respective previous probability was determined to remove prior audio source detections and reset prior audio source knowledge.

16. A mobile device for telecommunications services, the mobile device comprising:
  an apparatus configured to determine a certain spatial position of an audio source, the audio source being configured to transmit an audio signal, the apparatus comprising:
    a plurality of audio signal inputs, wherein each of the audio signal input is configured to receive an audio signal version of the transmitted audio signal; and
    processing circuitry which is configured to:
      determine a first probability for a direction of arrival of the audio signal version and a second probability for the direction of arrival of the audio signal version upon the basis of the plurality of the audio signal versions received within a first time interval, the direction of arrival being associated with a first spatial position relative to the apparatus;
      determine a third probability for the direction of arrival of the audio signal version and a fourth probability for the direction of arrival of the audio signal version upon the basis of the plurality of the audio signal versions received within a second time interval, the direction of arrival being associated with a second spatial position;
      determine a first probability difference between the first probability and the third probability;
      determine a second probability difference between the second probability and the fourth probability;
      combine the third probability and the first probability difference to obtain an updated third probability;
      combine the fourth probability with the second difference to obtain an updated fourth probability; and
      determine the certain spatial position upon the basis of the updated third probability and the updated fourth probability; and
    a microphone array configured to capture audio signals and connected to the plurality of signal inputs to provide the audio signals to the processing circuitry.

17. The mobile device for telecommunications services according to claim 16, wherein the microphone array comprises four microphones, which are disposed in a plane forming a quadrangular shape.

* * * * *